(12) United States Patent
Hickey et al.

(10) Patent No.: US 8,707,094 B2
(45) Date of Patent: *Apr. 22, 2014

(54) FAULT TOLERANT STABILITY CRITICAL EXECUTION CHECKING USING REDUNDANT EXECUTION PIPELINES

(71) Applicant: International Business Machines Corporation, Armonk, NY (US)

(72) Inventors: Mark J. Hickey, Rochester, MN (US); Adam J. Muff, Issaquah, WA (US); Matthew R. Tubbs, Issaquah, WA (US); Charles D. Wait, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,267

(22) Filed: Mar. 11, 2013

(65) Prior Publication Data

US 2013/0185604 A1     Jul. 18, 2013

Related U.S. Application Data

(63) Continuation of application No. 12/794,256, filed on Jun. 4, 2010, now Pat. No. 8,412,980.

(51) Int. Cl.
*G06F 11/16* (2006.01)
*G06F 11/00* (2006.01)

(52) U.S. Cl.
USPC ............... 714/11; 714/10; 714/15; 712/215

(58) Field of Classification Search
USPC ............... 714/10, 11, 15, 17, 35, 37; 712/215
See application file for complete search history.

(56) References Cited

U.S. PATENT DOCUMENTS

| | | | |
|---|---|---|---|
| 7,055,060 B2 * | 5/2006 | Nguyen et al. | .......... 714/11 |
| 7,941,698 B1 | 5/2011 | Aggarwal et al. | |
| 2004/0019771 A1 | 1/2004 | Quach | |
| 2004/0153763 A1 | 8/2004 | Grochowski et al. | |
| 2009/0044049 A1 | 2/2009 | Luick | |
| 2009/0119540 A1 | 5/2009 | Weiberle et al. | |
| 2010/0042813 A1 | 2/2010 | Hickey et al. | |
| 2011/0072303 A1 | 3/2011 | Hoogerbrugge | |

* cited by examiner

*Primary Examiner* — Joseph D Manoskey
(74) *Attorney, Agent, or Firm* — Wood, Herron & Evans LLP

(57) ABSTRACT

A circuit arrangement and method utilize existing redundant execution pipelines in a processing unit to execute multiple instances of stability critical instructions in parallel so that the results of the multiple instances of the instructions can be compared for the purpose of detecting errors. For other types of instructions for which fault tolerant or stability critical execution is not required or desired, the redundant execution pipelines are utilized in a more conventional manner, enabling multiple non-stability critical instructions to be concurrently issued to and executed by the redundant execution pipelines. As such, for non-stability critical program code, the performance benefits of having multiple redundant execution units are preserved, yet in the instances where fault tolerant or stability critical execution is desired for certain program code, the redundant execution units may be repurposed to provide greater assurances as to the fault-free execution of such instructions.

20 Claims, 6 Drawing Sheets

FAULT TOLERANT STABILITY CRITICAL EXECUTION CHECKING USING REDUNDANT EXECUTION PIPELINES

CROSS-REFERENCE TO RELATED APPLICATIONS

This application is a continuation of U.S. patent application Ser. No. 12/794,256, filed on Jun. 4, 2010 by Mark J. Hickey et al., the entire disclosure of which is incorporated by reference herein.

FIELD OF THE INVENTION

The invention is generally related to data processing, and in particular to processor architectures and execution units incorporated therein.

BACKGROUND OF THE INVENTION

Ionizing radiation such as alpha particles have the unfortunate ability to change the electrical state of electronic devices, often causing soft errors that may prevent such devices from operating properly. Often times designers will attempt to soft-error-proof an electronic device by employing redundancy coupled with voting circuitry in their designs to ensure that errant behavior is unlikely. Thus, rather than using a single logic circuit to compute a result, multiple redundant logic circuits are used, and the results are compared by separate voting circuitry to determine the correct result from among the results output by the redundant logic circuits.

Redundant circuitry, however, occupies valuable area on an integrated circuit chip and often increases power consumption substantially. This area and power consumption increase may also reduce the overall performance of an electronic device, since clock frequency may need to be reduced for a variety of reasons, including the need to accommodate the longer wires needed for larger circuit areas.

Redundant circuitry may be employed at a number of levels within the design of an electronic device, including, for example, within an execution unit of a processor. An execution unit constitutes the logic that executes the instructions that are supplied to a processor. And, whereas processors once included only a single execution unit, given the increased focus on parallelism in modern processor architectures, an execution unit is often one of many execution units that may be present on a given integrated circuit chip.

For example, at the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations, e.g., fixed point or floating point operations. Superscalar architectures may also utilize multiple redundant execution units so that multiple instructions can be dispatched to different execution units in a given clock cycle. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

Particularly with pipelined execution units, the circuit area required to implement redundant circuitry within certain stages of a pipeline, as well as the additional latency required to implement voting, can have an adverse impact on both the overall area and the performance of an execution unit. Furthermore, when multiple execution units are used in a given design, the adverse impacts are compounded.

Therefore, a need continues to exist in the art for a manner of protecting a circuit design from the adverse effects of ionizing radiation without the increased circuit area and decreased performance traditionally associated with redundant logic.

SUMMARY OF THE INVENTION

The invention addresses these and other problems associated with the prior art by providing a circuit arrangement and method that utilize existing redundant execution pipelines in a processing unit to execute multiple instances of certain types of instructions (designated herein as stability critical instructions) in parallel so that the results of the multiple instances of the instructions can be compared for the purpose of detecting errors. For other types of instructions for which fault tolerant or stability critical execution is not required or desired, the redundant execution pipelines are utilized in a more conventional manner, enabling multiple non-stability critical instructions to be concurrently issued to and executed by the redundant execution pipelines. As such, for non-stability critical program code, the performance benefits of having multiple redundant execution units are preserved, yet in the instances where fault tolerant or stability critical execution is desired for certain program code, the redundant execution units may be repurposed to execute multiple instances of stability critical instructions and provide greater assurances as to the fault-free execution of such instructions. Consequently, in many embodiments, some degree of fault tolerant computing may be enabled with minimal additional circuitry.

Therefore, consistent with one aspect of the invention, instructions may be executed in a processing unit of the type including issue logic coupled to a plurality of redundant execution pipelines. A plurality of non-stability critical instructions may be concurrently issued to the plurality of redundant execution pipelines such that the plurality of non-stability critical instructions are executed in parallel by the plurality of redundant execution pipelines, and a plurality of instances of a stability critical instruction may be concurrently issued to multiple redundant execution pipelines from the plurality of redundant execution pipelines such that the multiple instances of the stability critical instruction are executed in parallel by the multiple redundant execution pipelines. A fault may then be determined during execution of at least one instance of the stability critical instruction using fault detection logic coupled to the multiple redundant execution pipelines.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
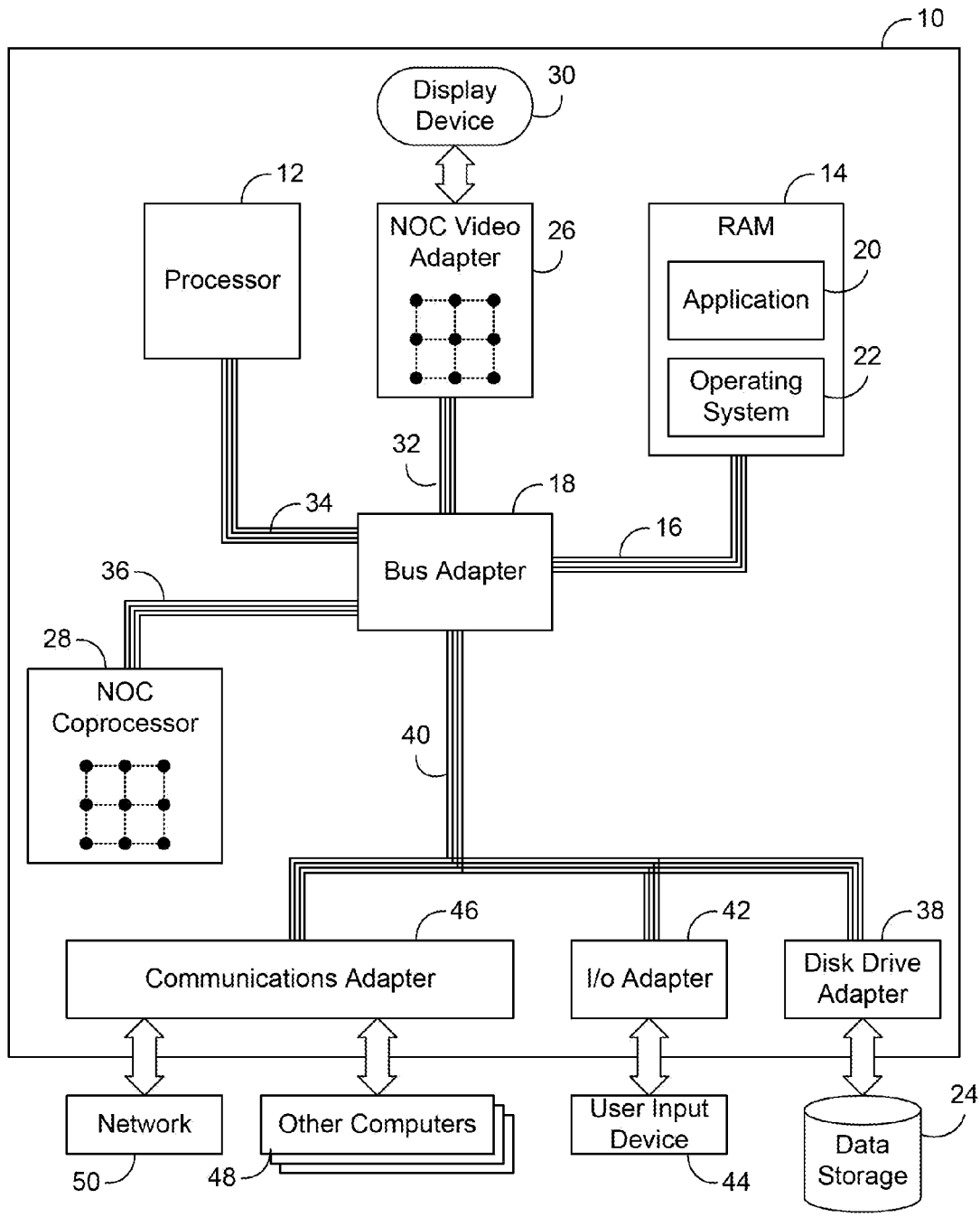
FIG. 1 is a block diagram of exemplary automated computing machinery including an exemplary computer useful in data processing consistent with embodiments of the present invention.

Embodiments consistent with the invention address the errors that may arise in integrated circuit chips due to effects such as alpha particles and other ionizing radiation without many of the adverse circuit area and performance issues resulting from the use of conventional redundant logic circuitry and voting logic. Instead, embodiments consistent with the invention utilize existing redundant execution pipelines to execute multiple instances of selected stability critical instructions in parallel. The results of the multiple instances of the instructions, executed by multiple execution pipelines, may then be compared for the purpose of detecting errors.

A stability critical instruction within the context of an invention is an instruction for which it is desired to execute with some degree of fault tolerance to ensure system stability. An instruction may be stability critical based upon instruction type (e.g., based upon its opcode), although other characteristics of an instruction may determine whether the instruction is or is not stability critical. For example, an instruction may be stability critical based upon the application, the thread, the user, the privilege mode, the area of memory of the instruction, the area of memory accessed by the instruction, the time of day, external I/O readings (e.g., the readings of a radiation detector), etc. with which the instruction is associated.

In addition, the manner in which an instruction is designated as stability critical may vary in different embodiments. For example, in some embodiments, an instruction may be tagged with a stability indicator, such as a stability bit, which is set whenever the instruction is to be executed in a fault tolerant or stability critical manner. An instruction may also be tagged based upon its opcode. In other embodiments, instructions associated with particular threads may be designated as stability critical.

An execution pipeline, in the context of the invention, includes logic that is capable of executing an instruction, e.g., as passed to the execution pipeline by an instruction unit. Execution pipelines are redundant to the extent that, with respect to a particular stability critical instruction, the execution pipelines are both capable of executing different instances of the instruction and generating the same result in the absence of any errors. Redundant execution pipelines may be, though need not be, identical to one another in terms of layout, instruction set, or performance. Redundant execution pipelines may be implemented within the same execution unit, e.g., in the case of a superscalar architecture, or may be implemented within different, yet redundant execution units. Redundant execution pipelines may be multithreaded or single threaded, may be scalar or vector-based, fixed or floating point, or any other type of logic capable of executing instructions, e.g., as might be used in specialized execution units such as graphics processing units, encryption/decryption units, coprocessors, XML processing units, etc. So long as the redundant execution pipelines are capable of executing the same instructions and generating the same results therefrom, the results generated by the redundant execution pipelines may be used to verify the correctness of the results.

In some embodiments, only two redundant execution pipelines may be used for the purposes of executing and verifying stability critical instructions, and the fault detection circuitry may only be capable of detecting, but not correcting, for errors. In other embodiments, however, more than two redundant execution pipelines may be used, and the fault detection circuitry may also be capable of correcting for errors, e.g., by using voting logic.

In contrast with conventional fault tolerant architectures, however, the redundant execution pipelines disclosed herein are not exclusively used to execute stability critical instructions, and thus, the redundant execution pipelines may, for non-stability critical instructions, operate independently of one another to increase overall instruction throughput.

In one embodiment discussed hereinafter, for example, the entries in an instruction queue are provided with mode or stability bits that indicate whenever the instructions associated with such entries should be issued to a pair of redundant execution pipelines for the purposes of parallel, fault tolerant execution. Once executed, the results from both pipelines are compared to detect an error. Since this checking happens only for critical code on existing execution pipelines, performance degradation caused by allocating two execution pipelines to a single instruction is minor. For other non-critical code, the execution pipelines operate separately from one another to handle different instructions in parallel. In addition, neither the power consumption nor the circuit area resulting from such design additions significantly increase compared to non-fault tolerant designs.

The manner in which operations may be checked or verified may differ in different embodiments of the invention. In the embodiments discussed hereinafter, for example, an operation may be verified by performing a full comparison of the results of the instructions, and signaling a miscompare if the results do not match. In other embodiments, parity values may be calculated from the results of the instructions, an error correcting code (ECC) or checksum may be computed, etc.

Other modifications will be apparent to one of ordinary skill in the art having the benefit of the instant disclosure.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
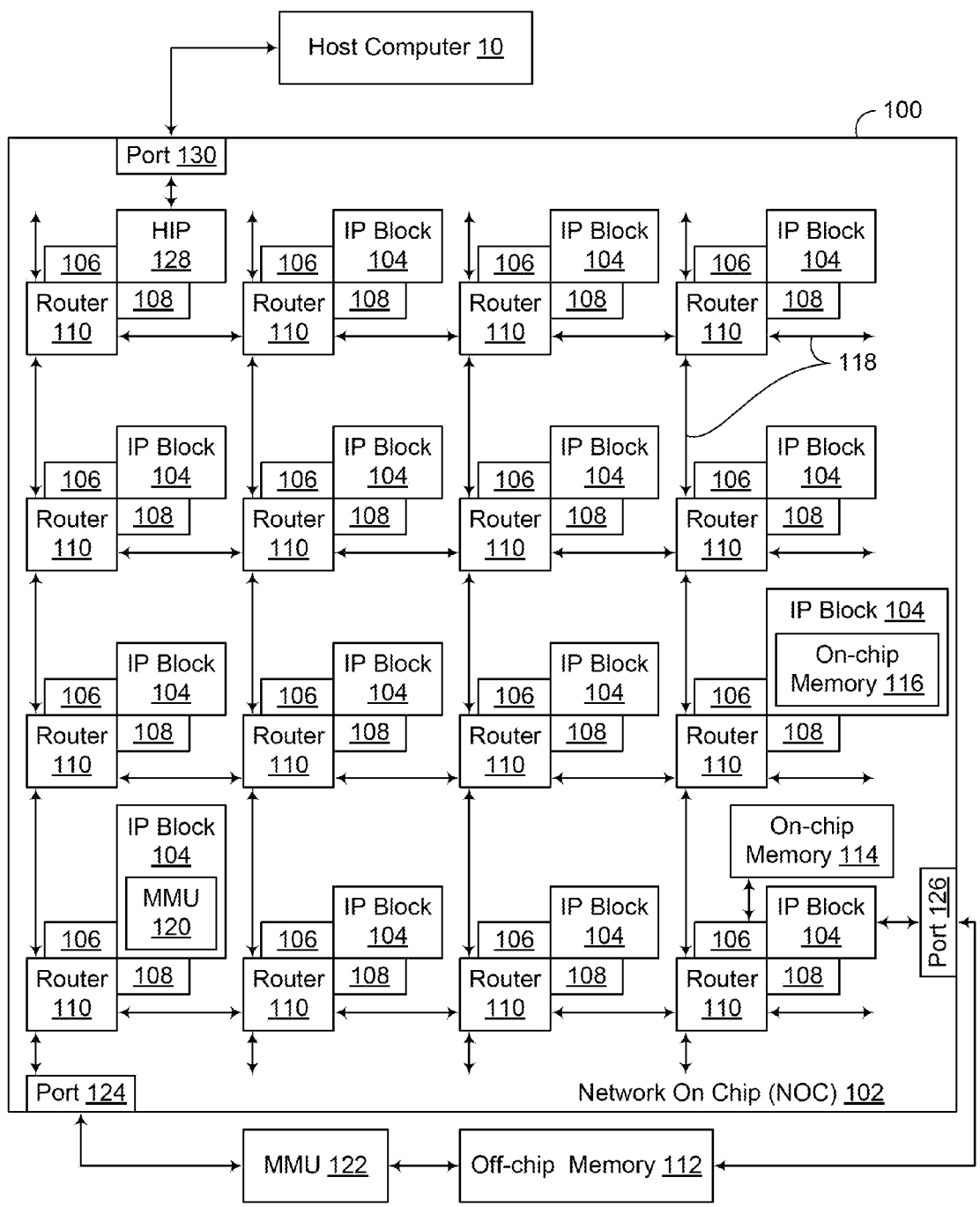
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, non-transitory physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
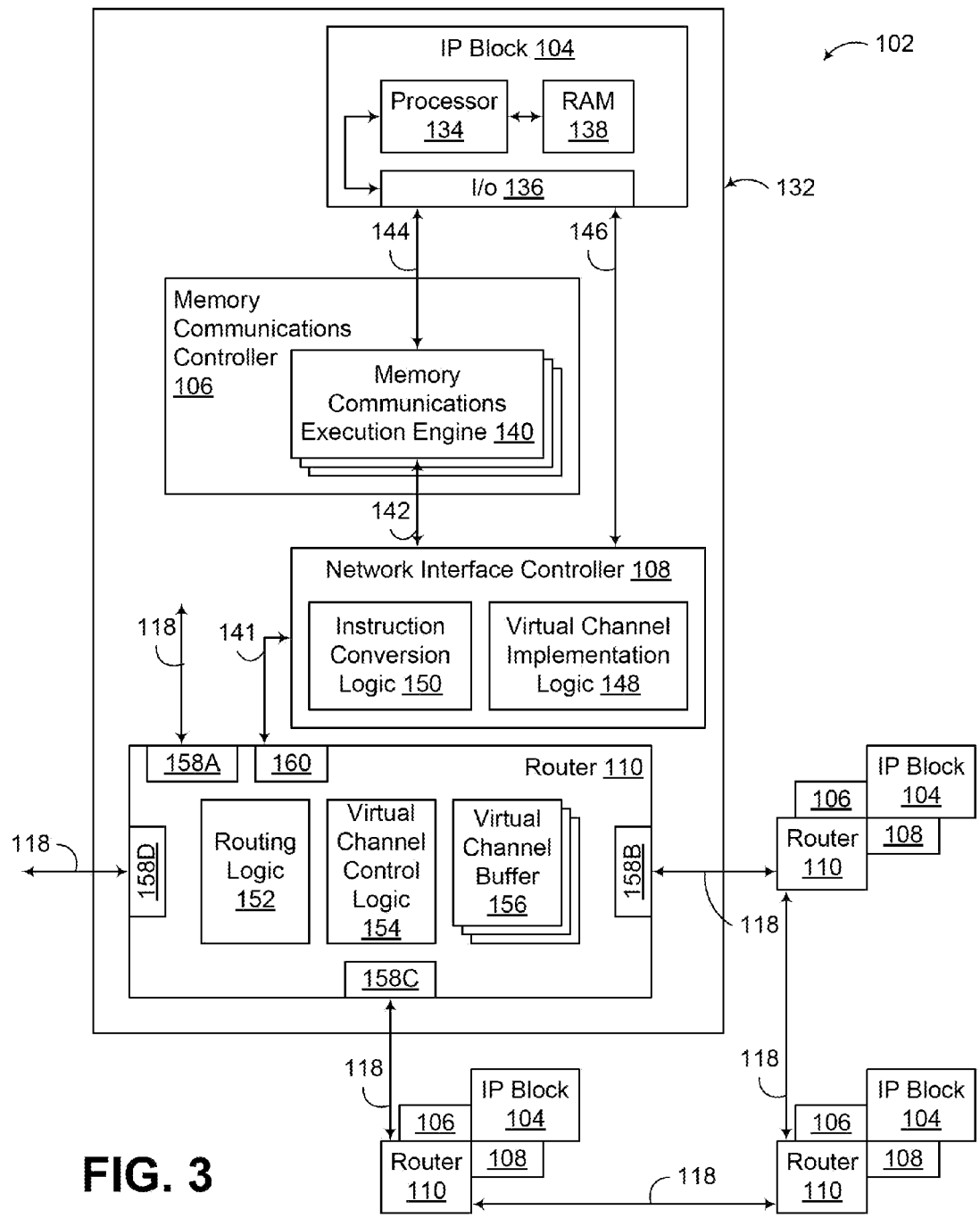
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
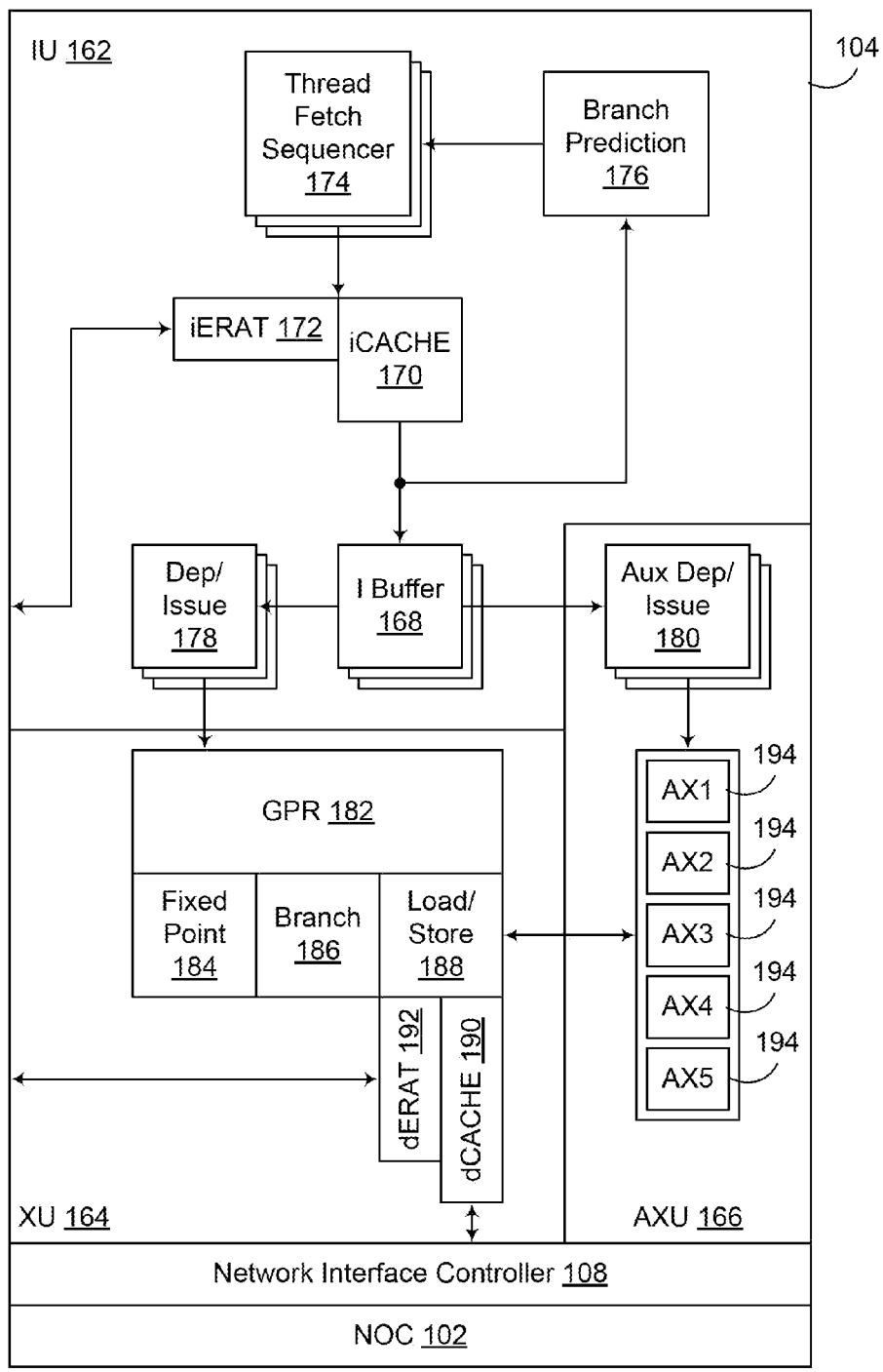
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Figure 5:
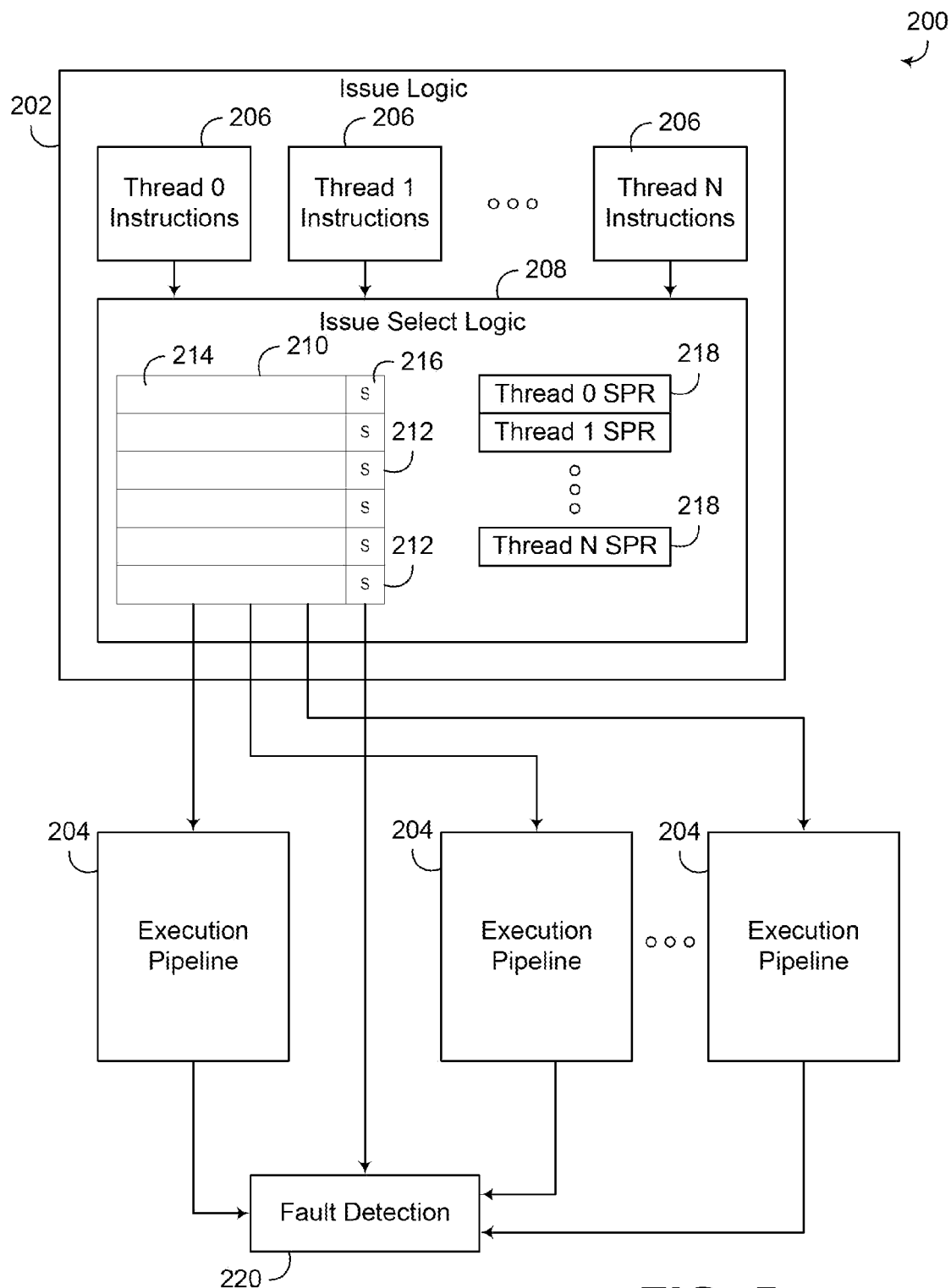
FIG. 5 is a block diagram of a processing unit incorporating fault tolerant circuitry consistent with the invention, and capable of being implemented within an IP block from the NOC of FIG. 2.

Fault Tolerant Stability Critical Execution Checking Using Redundant Execution Pipelines Turning now to FIG. 5, this figure illustrates an exemplary processing unit 200 incorporating fault tolerant stability critical execution checking in a manner consistent with the invention. Processing unit 200 may be implemented, for example, as a processor core in an IP block such as an IP block 104 from FIGS. 1-4. In the alternative, processing unit 200 may be implemented in other processor architectures that issue and execute instructions, including single or multi-core microprocessors or microcontrollers.

Processing unit 200 includes issue logic 202 that issues instructions to one or more execution pipelines 204. Issue logic 202 includes issue select logic 208 that is capable of issuing instructions from a plurality (N) of threads, illustrated at 206. Issue select logic 208 operates to schedule the issuance of instructions by the various threads, and typically includes logic for managing dependencies between instructions, in a manner generally understood in the art. Issue select logic 208 is capable of issuing multiple instructions from multiple threads to the multiple execution pipelines each cycle. In some embodiments, however, processing unit 200 may be single threaded, whereby instructions from the same thread are issued in a superscalar fashion to the plurality of execution pipelines 204.

Each execution pipeline 204 processes instructions issued to the execution pipeline by issue logic 202. A register file (not shown) may be dedicated to each execution pipeline or shared by multiple execution pipelines. The execution pipelines 204 may be considered in some embodiments to be separate, parallel execution units, or may be considered parallel pipelines within the same execution unit, and the execution pipelines may be configured to execute a wide variety of instructions, e.g., fixed point instructions, floating point instructions, scalar instructions, vector instructions, or practically any other type of instruction for which it may be desirable to execute in a fault tolerant or stability critical manner. In addition, issue logic 202 may be limited to issuing instructions only to one type of execution pipeline, or to multiple types of execution pipelines (e.g., capable of issuing both fixed point and floating point instructions to different execution pipelines).

In the illustrated embodiment of FIG. 5, fault tolerant or stability critical execution is supported without the additional circuit area typically associated with employing redundant circuits, by utilizing redundant (and in this embodiment, identical) execution pipelines to check the results of critical instructions. A mode or stability bit is kept along with each instruction that is determined by a special purpose register for each thread. As shown in FIG. 5, for example, an issue queue 210 in issue select logic 208 includes a plurality of slots 212, with each slot 212 including an instruction field 214, within which the instruction is stored, and a stability bit 216, which indicates whether the instruction is tagged as stability critical.

A plurality of thread-specific special purpose registers (SPR's) 218 are respectively used to selectively designate each thread, and thus the instructions executing in such a thread, as stability critical. In the alternative, a single SPR 218 may be used, with different bits or fields in the SPR allocated to different threads.

In this embodiment, software instructions may read and write SPR's 218 to change the stability critical checking mode for any given thread at any given time, and as such, a stability critical mode may be selectively enabled only for certain routines, loops or other critical sections of code for an application executed by processing unit 200. Instructions entering issue queue 210 are selectively tagged as stability critical based upon the mode for the associated thread as specified in the associated SPR 218.

When an instruction reaches a point in the issue queue/ issue select logic where the instruction is ready to be issued to an execution pipeline, the stability bit for that instruction is read and the issue select logic allocates multiple, identical issue slots for that instruction, such that multiple instances of the instruction are issued to multiple execution pipelines 204. For instructions where the stability bit is off, the issue select logic behaves in a conventional manner and only one issue slot is allocated, enabling other instructions to be concurrently allocated issue slots in other execution pipelines.

Fault detection logic 220 is coupled to issue queue 210 to receive the stability bit of the instructions being executed by execution pipelines 204, and to each execution pipeline 204 to receive the respective results of the executions of those instructions. Fault detection logic 220 includes comparison logic so that, at the end of execution pipelines 204, the results are sent to the comparison logic, and if the results are not equal, an error condition is signaled. Otherwise, the result will be completed (e.g., the result may be written into a register file, register rename mapping may be committed, etc.) In addition, in some embodiments, correction logic may be incorporated into processing unit 200, or even within fault detection logic 220, to enable the correct result to be determined from the results from the multiple redundant execution pipelines 204. For example, in one embodiment, three execution pipelines 204 may be configured to execute three instances of a stability critical instruction, and fault detection logic 220 may include voting logic to select the result output by a majority of execution pipelines.

The usage of additional execution pipelines to execution multiple instances of the same instruction in the embodiment of FIG. 5 allows software to have the flexibility to execute critical code sections with additional confidence in the accuracy of the results, while for less critical code sections the execution pipelines may be used in a superscalar or otherwise parallel and separate manner for high performance. In addition, since circuit redundancy is not employed, the impact to area usage from this design is minimal.

In one implementation, only two execution pipelines 204 are provided in processing unit 200, and fault detection logic 220 is capable of detecting, but not otherwise correcting, an error. While such an implementation does not offer the full error correction coverage that triple redundancy provides, it does provide a significant increase in error detection without significant costly area increase, thus making it suitable for use in applications where ionizing radiation is still present, but not as prevalent or critical as in mission critical applications such as in outer space or near a nuclear reactor. For example, one suitable application of a two execution pipeline implementation would be in mission-critical data center server microprocessors, where both reliability and performance are extremely important.

Figure 6:
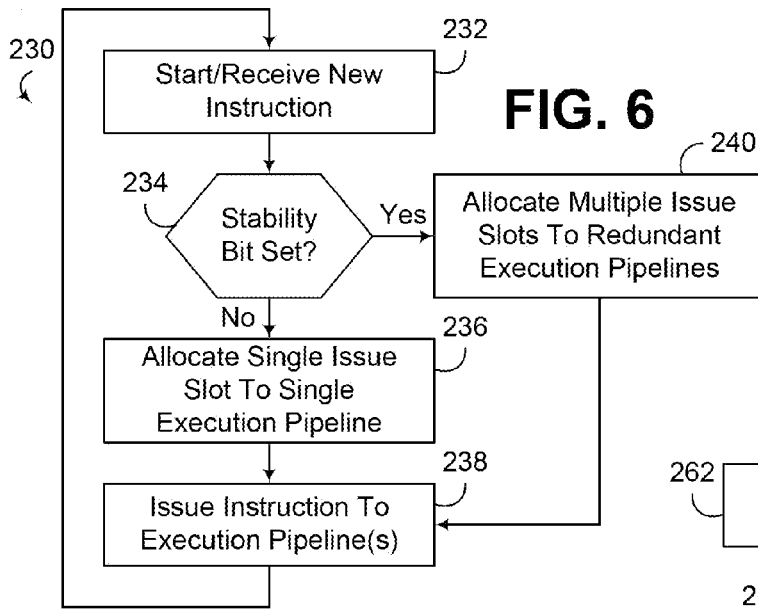
FIG. 6 is a flowchart illustrating a sequence of operations performed by the issue select logic referenced in FIG. 5.

Now turning to FIG. 6, this figure illustrates a sequence of operations 230 performed by issue select logic 208 in connection with issuing instructions to execution pipelines 204. Block 232 starts or receives a new instruction, and block 234 determines whether the stability bit is set, indicating that the instruction is a stability critical instruction. The stability bit may be determined, for example, based upon the mode set in the SPR 218 for the thread with which the instruction is associated.

If not, the instruction is issued to a single execution pipeline by passing control to block 236 to allocate a single issue slot 212 in issue queue 208 (copying the instruction in field 214 and clearing the stability bit in field 216), and to block 238 to issue the instruction to a single execution pipeline, in much the same manner as a conventional multi-execution pipeline processing unit. As such, other instructions, e.g., from other threads or from the same thread, may concurrently be allocated to other issue slots and issued to other execution pipelines for superscalar or parallel execution.

If the stability bit is set for the instruction, however, block 234 passes control to block 240 to allocate multiple issue slots 212 in issue queue 208 (and copy the instruction to fields 214 and set the stability bits in fields 216) to the instruction (thus creating multiple instances of the instruction in the issue queue), prior to passing control to block 238 to issue the instruction, or more particularly, the multiple instances of the instruction, to the multiple redundant execution pipelines.

Figure 7:
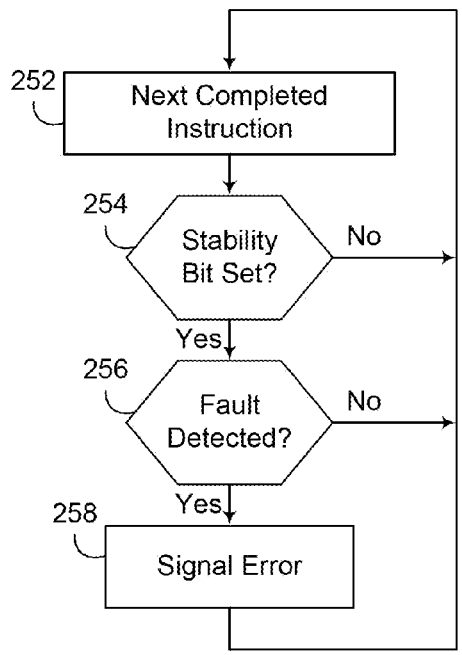
FIG. 7 is a flowchart illustrating a sequence of operations performed by the fault detection logic referenced in FIG. 5.

Turning next to FIG. 7, this figure illustrates a sequence of operations 250 performed by fault detection logic 220 to check the results of instructions executed by the multiple redundant execution pipelines 204. Block 252 waits for the next completed instruction (e.g., each clock cycle), and block 254 determines whether the stability bit is set for the instruction that has just completed (e.g., by checking the stability bit for the issue queue slot allocated to the instruction. If the stability bit is not set, no checking need be performed, and control returns to block 252.

If, however, the stability bit is set, block 254 passes control to block 256 to determine whether a fault has been detected. For example, fault detection logic may include comparison logic to compare the results of multiple redundant execution pipelines, and assert a signal in response to any miscompares. If a miscompare is detected, control passes to block 258 to signal an error, otherwise, control returns to block 252 without signaling any such error.

The signaling of an error by fault detection logic in block 258 may result in various actions being taken either within processing unit 200 or by higher level software executing on processing unit 200. For example, processing unit 200 may include error recovery logic capable of flushing an execution pipeline and re-executing an instruction, or capable of restoring a last known good state (e.g., by loading a cached register file) and restarting execution from the last known good state. Processing unit 200 may also signal an interrupt that is handled by interrupt handler software execution by the processing unit. In addition, in some instances, e.g., where multiple processing units are supported or where multiple processing cores are supported within the same processing unit, the last known good state may be restored on a different processing unit or processing core to continue execution, with the faulty execution logic disabled and the software (e.g., an operating system or kernel) notified of the error. Other fault tolerant or other recovery operations may also be performed consistent with the invention, as will be apparent to one of ordinary skill in the art.

Figure 8:
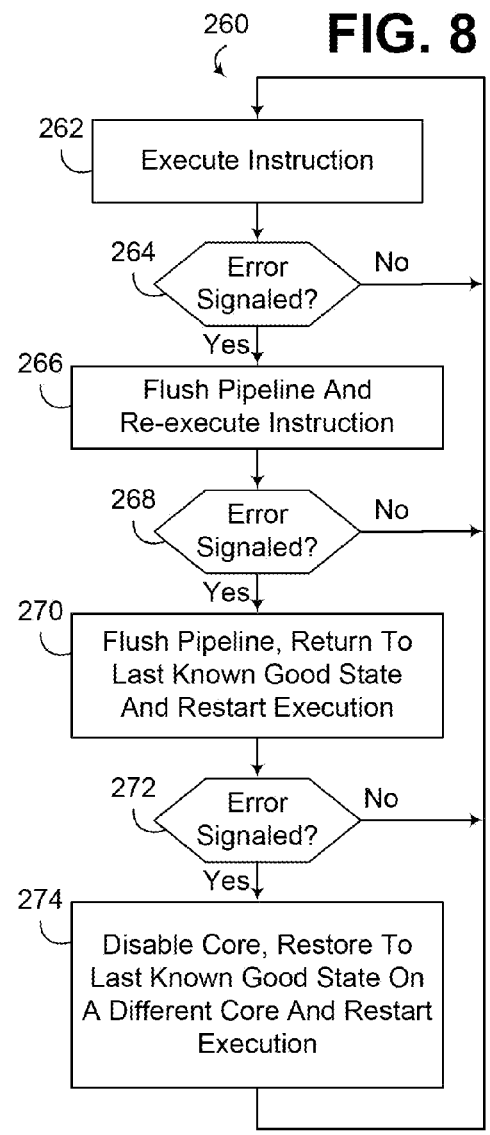
FIG. 8 is a flowchart illustrating a sequence of operations performed by the processing unit referenced in FIG. 5 for implementing multi-level error recovery.

For example, FIG. 8 illustrates a sequence of operations 260 that may be performed by processing unit 200 in hardware, in software, or in a combination of the same, to implement a multi-level error recovery protocol using processing unit 200. Block 262 attempts to execute a stability critical instruction in the manner described above, and block 264 determines, e.g., from fault detection logic 220, whether an error was signaled as a result of the execution. If not, control returns to block 262 to execute subsequent instructions.

If an error is signaled, however, block 264 passes control to block 266 to flush the pipeline and re-execute the instruction. Block 268 then determines whether an error was signaled as a result of the re-execution. If not, control returns to block 262 to execute subsequent instructions. If an error is signaled, however, block 268 passes control to block 270 to flush the pipeline, return to the last known good state, and restart execution.

Block 272 then determines whether an error was signaled as a result of the restart. If an error is not signaled, control returns to block 262 to execute subsequent instructions. If an error is signaled, however, block 272 passes control to block 274 to disable the current core, restore the last known good state to a different core and restart execution.

Therefore, by utilizing redundant execution pipelines to check the results of multiple instances of an instruction, embodiments consistent with the invention typically avoid the additional circuit area associated with the use of dedicated redundant circuits to verify the results of operations performed by execution units. In addition, in many instances, the effect on performance and power consumption will be minimal. Furthermore, while in some applications the herein-described techniques will not provide the same degree of error correction coverage that triple redundancy and voting provides, the techniques nonetheless generally provide a significant increase in error detection without an extremely costly area increase.

Various modifications may be made to the illustrated embodiments consistent with the invention. For example, mode bits may be carried along with instructions through execution pipelines and provided to fault detection logic, avoiding the need for the fault detection logic to access the issue queue. A stability critical mode for an instruction may be set based upon a special opcode or field in the instruction, rather than via an SPR. A stability critical mode may be set or cleared using a dedicated instruction rather than via an SPR. A stability critical mode may also be set based upon another inherent characteristic of an instruction, e.g., the privilege mode under which the instruction executions.

Various additional modifications will be apparent to one of ordinary skill having the benefit of the instant disclosure. Therefore, the invention lies in the claims hereinafter appended.

What is claimed is:

1. A circuit arrangement, comprising:
   a plurality of redundant execution pipelines disposed in at least one processing core on at least one integrated device;
   issue logic coupled to the plurality of redundant execution pipelines, the issue logic configured to concurrently issue a plurality of non-stability critical instructions to the plurality of redundant execution pipelines such that the plurality of non-stability critical instructions are executed in parallel by the plurality of redundant execution pipelines, the issue logic further configured to concurrently issue a plurality of instances of a stability critical instruction to multiple redundant execution pipelines from the plurality of redundant execution pipelines such that the multiple instances of the stability critical instruction are executed in parallel by the multiple redundant execution pipelines; and
   fault detection logic coupled to the multiple redundant execution pipelines and configured to determine a fault during execution of at least one instance of the stability critical instruction;
   wherein the issue logic is configured to determine that the stability critical instruction is stability critical, wherein the issue logic is configured to determine that the stability critical instruction is stability critical by checking a mode indicator associated with the stability critical instruction, wherein the issue logic is configured to issue instructions from a plurality of threads, and wherein the mode indicator is associated with a thread associated with the stability critical instruction.

2. The circuit arrangement of claim 1, wherein the plurality of redundant execution pipelines are disposed in the same execution unit.

3. The circuit arrangement of claim 1, wherein the plurality of redundant execution pipelines are disposed in a plurality of execution units.

4. The circuit arrangement of claim 1, wherein the fault detection logic is configured to compare results generated during execution of the plurality of instances of the stability critical instruction and signal an error in response to a miscompare of the results.

5. The circuit arrangement of claim 1, wherein the fault detection logic is configured to initiate a pipeline flush and re-execution of the stability critical instruction in response to determining the fault.

6. The circuit arrangement of claim 1, wherein the fault detection logic is configured to initiate a pipeline flush and restore to a last known good state in response to determining the fault.

7. The circuit arrangement of claim 1, wherein the fault detection logic is configured to initiate a restore to a last known good state on a different processing core in response to determining the fault.

8. The circuit arrangement of claim 1, wherein the mode indicator is disposed in a software-accessible special purpose register for the thread.

9. The circuit arrangement of claim 1, wherein the issue logic includes an issue queue including a plurality of slots, wherein the issue logic is configured to issue a non-stability critical instruction by allocating a single slot in the issue queue to the instruction, and wherein the issue logic is configured to issue the stability critical instruction by allocating a plurality of slots in the issue queue to the instruction.

10. The circuit arrangement of claim 9, wherein the issue logic is further configured to tag the stability critical instruction as stability critical by setting a stability indicator in each slot allocated to the stability critical instruction.

11. The circuit arrangement of claim 1, wherein the plurality of redundant execution pipelines are disposed in the same processing core.

12. A program product comprising a non-transitory computer readable medium and logic definition program code resident on the computer readable medium and defining the circuit arrangement of claim 1.

13. A method of executing instructions in a processing unit of the type including issue logic coupled to a plurality of redundant execution pipelines disposed in at least one processing core, the method comprising:

concurrently issuing a plurality of non-stability critical instructions to the plurality of redundant execution pipelines such that the plurality of non-stability critical instructions are executed in parallel by the plurality of redundant execution pipelines;

concurrently issuing a plurality of instances of a stability critical instruction to multiple redundant execution pipelines from the plurality of redundant execution pipelines such that the multiple instances of the stability critical instruction are executed in parallel by the multiple redundant execution pipelines; and determining a fault during execution of at least one instance of the stability critical instruction using fault detection logic coupled to the multiple redundant execution pipelines;

wherein the issue logic includes an issue queue including a plurality of slots, wherein issuing a non-stability critical instruction includes allocating a single slot in the issue queue to the instruction, wherein issuing the stability critical instruction includes allocating a plurality of slots in the issue queue to the instruction, and wherein the method further comprises tagging the stability critical instruction as stability critical by setting a stability indicator in each slot allocated to the stability critical instruction.

14. The method of claim 13, wherein determining the fault includes comparing results generated during execution of the plurality of instances of the stability critical instruction and signaling an error in response to a miscompare of the results.

15. The method of claim 13, wherein determining the fault includes initiating a pipeline flush and re-execution of the stability critical instruction in response to determining the fault.

16. The method of claim 13, wherein determining the fault includes initiating a pipeline flush and restore to a last known good state in response to determining the fault.

17. The method of claim 13, wherein determining the fault includes initiating a restore to a last known good state on a different processing core in response to determining the fault.

18. The method of claim 13, further comprising determining that the stability critical instruction is stability critical.

19. The method of claim 18, wherein determining that the stability critical instruction is stability critical includes checking a mode indicator associated with the stability critical instruction.

20. The method of claim 19, wherein the issue logic is configured to issue instructions from a plurality of threads, wherein the mode indicator is associated with a thread associated with the stability critical instruction, and wherein the mode indicator is disposed in a software-accessible special purpose register for the thread.

* * * * *